United States Patent
Xu et al.

(10) Patent No.: US 12,047,829 B2
(45) Date of Patent: Jul. 23, 2024

(54) METHOD, DEVICE AND COMPUTER READABLE MEDIUM FOR CENTRALIZED UNIT SWITCH

(71) Applicant: Nokia Solutions and Networks Oy, Espoo (FI)

(72) Inventors: Xiang Xu, Nanjing (CN); Ilkka Antero Keskitalo, Oulu (FI); Esa Mikael Malkamäki, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 388 days.

(21) Appl. No.: 17/426,197

(22) PCT Filed: Jan. 29, 2019

(86) PCT No.: PCT/CN2019/073772
§ 371 (c)(1),
(2) Date: Jul. 28, 2021

(87) PCT Pub. No.: WO2020/154918
PCT Pub. Date: Aug. 6, 2020

(65) Prior Publication Data
US 2022/0182905 A1 Jun. 9, 2022

(51) Int. Cl.
*H04W 36/12* (2009.01)
*H04W 36/30* (2009.01)
*H04W 36/32* (2009.01)

(52) U.S. Cl.
CPC .......... *H04W 36/12* (2013.01); *H04W 36/30* (2013.01); *H04W 36/32* (2013.01)

(58) Field of Classification Search
CPC ...... H04W 36/12; H04W 36/30; H04W 36/32
See application file for complete search history.

(56) References Cited

U.S. PATENT DOCUMENTS

| 2002/0167965 | A1* | 11/2002 | Beasley | ................... H04L 61/00 |
| 2013/0336153 | A1* | 12/2013 | Liang | ................. H04W 36/0058 |
| 2018/0014237 | A1* | 1/2018 | Xu | ......................... H04W 76/10 |

(Continued)

FOREIGN PATENT DOCUMENTS

| CN | 107079361 A | 8/2017 |
| CN | 109151871 A | 1/2019 |
| WO | 2018/030819 A1 | 2/2018 |

OTHER PUBLICATIONS

Office action received for corresponding Chinese Patent Application No. 201980090706.2, dated Oct. 26, 2022, 8 pages of office action and no page of translation available.

(Continued)

*Primary Examiner* — Ronald B Abelson
(74) *Attorney, Agent, or Firm* — Harrington & Smith

(57) ABSTRACT

Embodiments of the disclosure provide a method, device and computer readable medium for centralized unit switch. According to embodiments of the present disclosure, the DU transmits identity information of a target CU/DU to the source CU for the CU switch. The target CU does not need to initiate context setup procedure to set up context for the terminal device. Thus, the switch is implemented with minimized signaling and interruption in the data connection and the switched is completed faster by avoiding the unnecessary F1 AP context setup.

20 Claims, 8 Drawing Sheets

(56) References Cited

U.S. PATENT DOCUMENTS

2018/0376380 A1* 12/2018 Leroux ................. H04W 76/27
2019/0349077 A1* 11/2019 Alasti ................. H04B 7/2125

OTHER PUBLICATIONS

"(TP for NR BL CR for TS 38.423) Source TEID Reuse for handover", 3GPP TSG-RAN WG3#101, R3-184924, Agenda: 31.3.4.14, Nokia, Aug. 20-24, 2018, 4 pages.

Office action received for corresponding Chinese Patent Application No. 201980090706.2, dated May 17, 2023, 10 pages of office action and no page of translation available.

"3rd Generation Partnership Project; Technical Specification Group Radio Access Network; NG-RAN; Architecture description (Release 15)", 3GPP TS 38.401, V15.3.0, Sep. 2018, pp. 1-39.

"Study on solutions evaluation for NR to support Non Terrestrial Network", 3GPP TSG RAN meeting #80, RP-181370, Agenda: 9.1.17, Thales, Jun. 11-14, 2018, 5 pages.

"3rd Generation Partnership Project; Technical Specification Group Services and System Aspects; Study on architecture aspects for using satellite access in 5G (Release 16)", 3GPP TR 23.737, V0.3.0, Oct. 2018, pp. 1-23.

"3rd Generation Partnership Project; Technical Specification Group Radio Access Network; Solutions for NR to support non terrestrial networks (NTN) (Release 16)", 3GPP TR 38.821, V0.2.0, Oct. 2018, pp. 1-27.

"Email: # 1_NTN_Mob_mgmt_principles", 3GPP TSG RAN WG3 Meeting #101bis, R3-186257, Agenda: 20.2, Thales, Oct. 8-12, 2018, 16 pages.

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423, V15.3.0, Sep. 2018, pp. 1-401.

International Search Report and Written Opinion received for corresponding Patent Cooperation Treaty Application No. PCT/CN2019/073772, dated Jul. 25, 2019, 9 pages.

"TP for BL CR for TS 38.423) Source TEID Reuse for handover", 3GPP TSG-RAN WG3#102, R3-186398, Agenda: 31.3.1.31, Nokia, Nov. 12-16, 2018, 5 pages.

* cited by examiner

METHOD, DEVICE AND COMPUTER READABLE MEDIUM FOR CENTRALIZED UNIT SWITCH

RELATED APPLICATION

This application was originally filed as PCT Application No. PCT/CN2019/073772, filed on 29 Jan. 2019.

FIELD

Embodiments of the present disclosure generally relate to communication techniques, and more particularly, to methods, devices and computer readable medium for centralized unit (CU) switch.

BACKGROUND

In recent years, different communication technologies have been proposed to improve communication performances, such as, the New Radio (NR) system. Some new architecture of communication systems has been proposed. For example, in 5G standalone employment, the base station (for example, gNB) may employ a separate mode of a centralized unit (CU) and distributed unit (DU). A DU connects to only one CU. In some scenarios, the DU may switch its connected CU during the normal operation (also referred to as "CU switch" or "CU switching" hereinafter). For example, in non-terrestrial network, the DU may be implemented at a satellite and the CU may be implemented at the earth. Due to movement of the satellite, CU switching may occur.

SUMMARY

Generally, embodiments of the present disclosure relate to a method for CU switch and the corresponding communication devices.

In a first aspect, embodiments of the disclosure provide a device. The device comprises: at least on processor, and a memory coupled to the at least one processor, the memory storing instructions therein, the instructions, when executed by the at least one processor, causing the device to: in response to a determination at a distributed unit (DU) to provide information for a centralized unit (CU) switch, transmit to a source CU serving the DU a first message providing the information for switching from the source CU to a target CU. The device is also caused to receive, from the source CU, a second message allowing switch from the source CU to the target CU. The device is further caused to switch a connection with the source CU to the target CU.

In a second aspect, embodiments of the disclosure provide a device. The device comprises: at least on processor, and a memory coupled to the at least one processor, the memory storing instructions therein, the instructions, when executed by the at least one processor, causing the device to: receive, at a source centralized unit (CU) and from a distributed unit (DU) served by the source CU, a first message providing information for switching from the source CU to a target CU. The device is also caused to transmit to the target CU a request indicating the switching from the source CU to a target CU. The device is further caused to receive an acknowledgement to the request from the CU target. The device is yet caused to transmit a second message to the DU, the second message allowing the DU to switch from the source CU to the target CU.

In a third aspect, embodiments of the disclosure provide a device. The network device comprises: at least on processor, and a memory coupled to the at least one processor, the memory storing instructions therein, the instructions, when executed by the at least one processor, causing the network device to: receive, at a target centralized unit (CU), a request for a distributed unit (DU) to switch from a source CU to the target CU. The device is further caused to transmit, to the source CU, an acknowledgment to the request.

In a fourth aspect, embodiments of the present disclosure provide a method. The method comprises: in response to a determination at a distributed unit (DU) to provide information for a centralized unit (CU) switch, transmitting to a source CU serving the DU a first message providing the information for switching from the source CU to a target CU. The method further comprises receiving, from the source CU, a second message allowing switch from the source CU to the target CU. The method also comprises switching a connection with the source CU to the target CU.

In a fifth aspect, embodiments of the present disclosure provide a method. The method comprises: receiving, at a source centralized unit (CU) and from a distributed unit (DU) served by the source CU, a first message providing information for switching from the source CU to a target CU. The method also comprises transmitting to the target CU a request indicating the switching from the source CU to the target CU. The method further comprises receiving an acknowledgement to the request from the CU target. The method yet comprises transmitting a second message to the DU, the second message allowing the DU to switch from the source CU to the target CU.

In a sixth aspect, embodiments of the present disclosure provide a method. The method comprises receiving, at a target centralized unit (CU), a request for a distributed unit (DU) to switch from a source CU to the target CU. The method also comprises transmitting, to the source CU, an acknowledgment to the request.

In a seventh aspect, embodiments of the disclosure provide an apparatus for communication. The apparatus comprises means for in response to a determination at a distributed unit (DU) to provide information for a centralized unit (CU) switch, transmitting to a source CU serving the DU a first message providing the information for switching from the source CU to a target CU. The apparatus further comprises means for receiving, from the source CU, a second message allowing switch from the source CU to the target CU. The apparatus also comprises means for switching a connection with the source CU to the target CU.

In an eighth aspect, embodiments of the disclosure provide an apparatus for communication. The apparatus comprises means for receiving, at a source centralized unit (CU) and from a distributed unit (DU) served by the source CU, a first message providing information for switching from the source CU to a target CU. The apparatus also comprises means for transmitting to the target CU a request indicating the switching from the source CU to the target CU. The apparatus further comprise means for receiving an acknowledgement to the request from the target CU. The apparatus yet comprise means for transmitting a second message to the DU, the second message allowing the DU to switch from the source CU to the target CU.

In a ninth aspect, embodiments of the disclosure provide an apparatus for communication. The apparatus comprises means for receiving, at a target centralized unit (CU), a request for a distributed unit (DU) to switch from a source CU to the target CU. The apparatus also comprises means for transmitting, to the source CU, an acknowledgment to the request.

In a tenth aspect, embodiments of the disclosure provide a computer readable medium. The computer readable medium stores instructions thereon, the instructions, when executed by at least one processing unit of a machine, causing the machine to implement the methods according to the fourth, fifth and sixth aspects.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
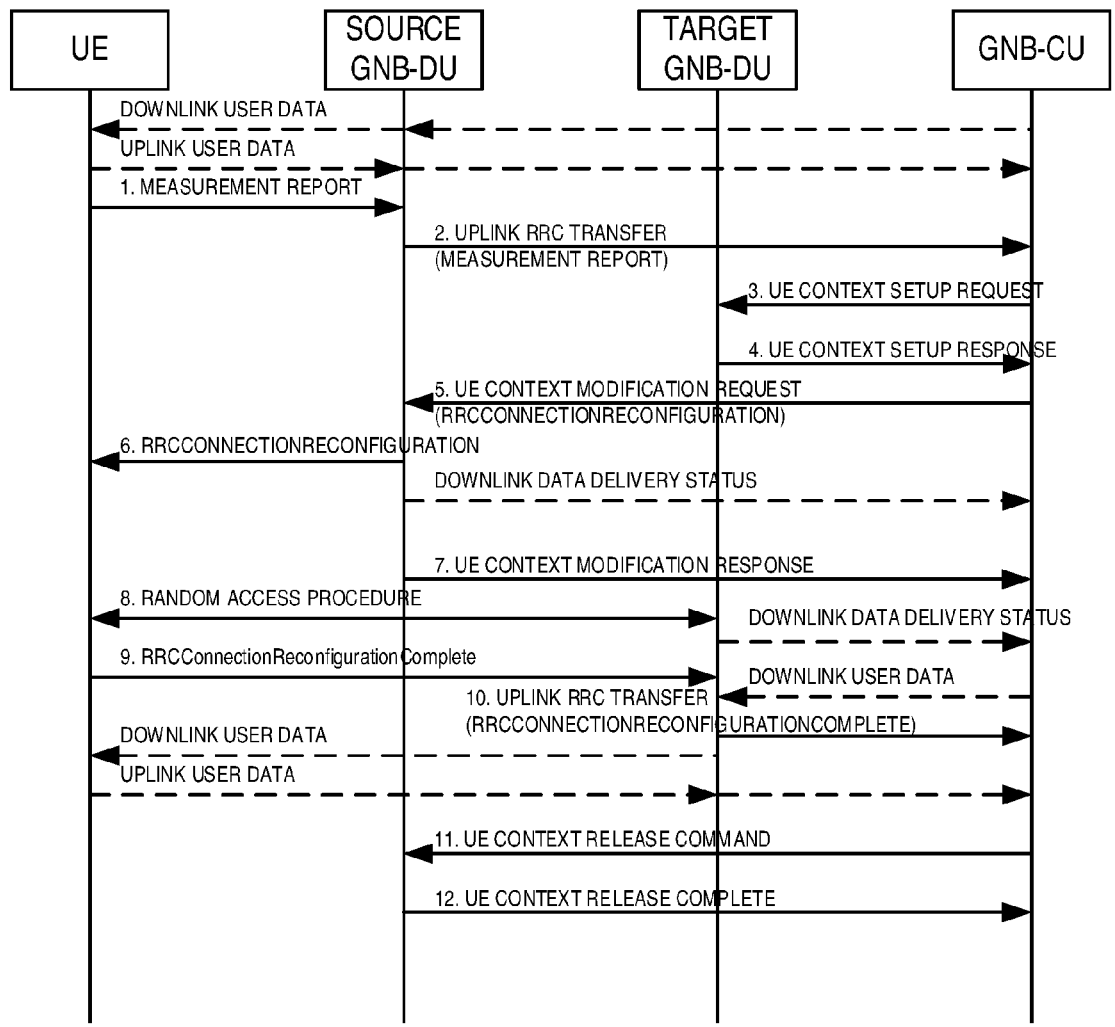
FIG. 1 illustrates a schematic diagram of interactions of inter-DU/intra-CU mobility according to conventional technologies.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as NR, Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB or next generation NB (also referred to as a gNB), an Integrated Access and Backhaul node (referred to as an IAB node), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), an Integrated Access and Backhaul-Mobile Terminal (IAB-MT), a Subscriber Station (SS), a Portable Subscriber Station, a Mobile Station (MS), or an Access Terminal (AT).

The term "circuitry" used herein may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with
    software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The term "centralized unit" used herein refers to a logical node which can be implemented at any suitable devices and includes the gNB functions like Transfer of user data, Mobility control, Radio access network sharing, Positioning, Session Management and the like, except those functions allocated exclusively to the DU. For example, a gNB Central Unit (CU) host Radio Resource Control (RRC), Service Data Adaptation Protocol (SDAP) and Packet Data Convergence Protocol (PDCP) protocols of the gNB or RRC and PDCP protocols of the en-gNB that controls the operation of one or more gNB-DUs. The CU terminates the F1 interface connected with the gNB-DU. CU controls the operation of DUs over front-haul (F1) interface. A centralized unit (CU) may also be known as a baseband unit (BBU)/a radio cloud center (RCC)/a centralized radio access network (C-RAN)/a virtualized radio access network (V-RAN).

The term "distributed unit" used herein refers to a logical node which can be implemented at any suitable devices and includes a subset of the gNB functions, depending on the functional split option. For example, a gNB Distributed Unit (DU) host Radio Link Control (RLC), Media Access Control (MAC) and Physical (PHY) layers of the gNB or en-gNB, and its operation is partly controlled by gNB-CU. One DU supports one or more cells. One DU only connects to one CU. One cell is supported by only one gNB-DU. The gNB-DU terminates the F1 interface connected with the CU. Its operation is controlled by the CU. A distributed unit (DU) may be known with other names like a remote radio head (RRH)/a remote radio unit (RRU).

In some scenarios, a DU may switch its F1 connection to another CU. For example, in a non-terrestrial network, when the satellite moves out of the coverage of current connected CU and enters the coverage of a new CU, the DU on the satellite needs to switch the F1 from the current connected CU to a new CU. In another example, in an IAB system, when the IAB node (i.e. the collocated IAB-MT) lost the connection, or has a bad connection with current CU, the IAB node (i.e. the collocated IAB-DU) needs to switch the F1 from the currently connected CU to a new CU. When connecting with different CUs, the DU may use different identities, for example, gNB-DU identifier, Cell Global Identifier (CGI), Physical Cell Identifier (PCI), and the like. The following description uses the non-terrestrial network as example, but it also applies to other example.

Figure 2:
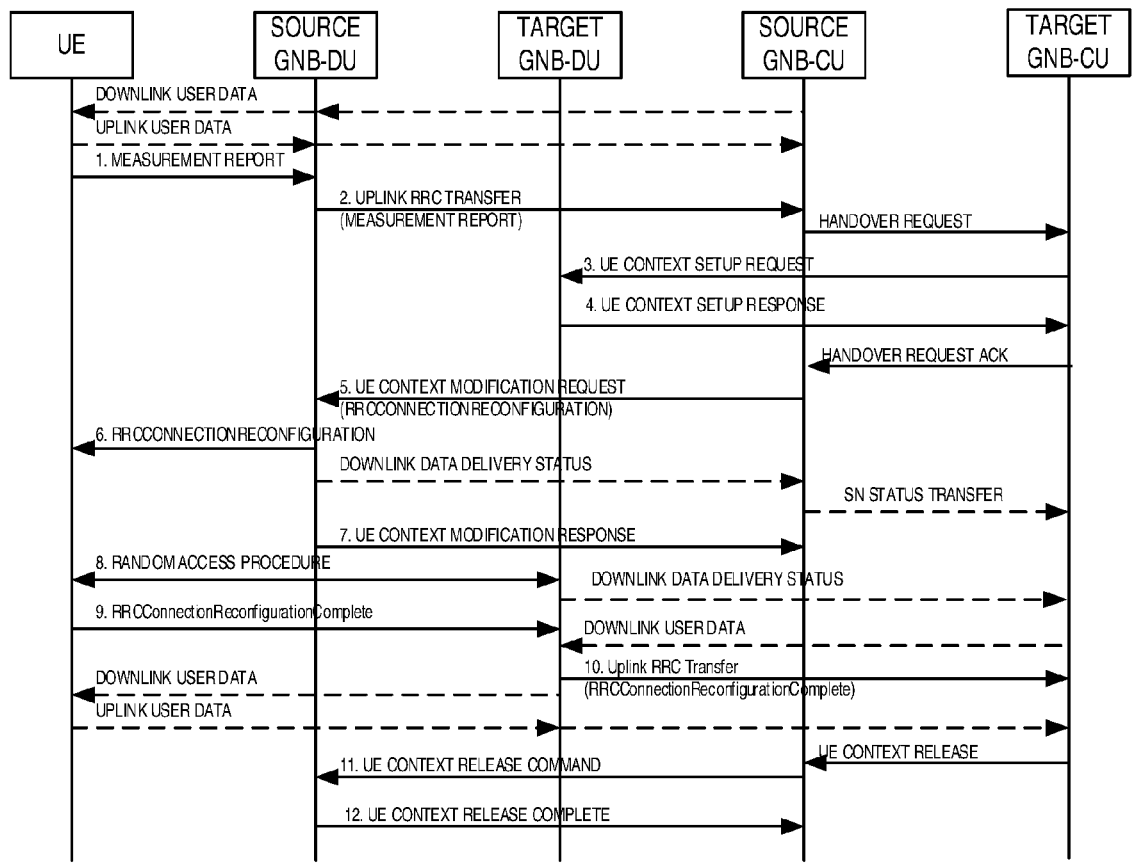
FIG. 2 illustrates a schematic diagram of interactions of inter-DU/inter-CU mobility according to conventional technologies.

FIG. 1 illustrates a schematic diagram of interactions of inter-DU/intra-CU mobility according to conventional technologies. FIG. 2 illustrates a schematic diagram of interactions of inter-DU/inter-CU mobility according to conventional technologies.

In a non-GEO Non-Terrestrial Network (NTN), depending on the satellite's location, the DU on the satellite may change the F1 connection from one CU to another CU on the ground. The satellite/DU may have a prior knowledge on when it needs to disconnect from current CU, and switch to target CU. Alternatively, the source CU may have a prior knowledge on when a DU in the satellite needs to disconnect from current CU and switch to target CU. From the UE's perspective, it looks like an inter-DU/inter-CU handover. The UE needs to be reconfigured with the new configurations, for example, security parameter, for the new CU. There are some issues in the conventional inter-DU/inter-CU handover.

Issue 1: How to trigger the handover? The normal handover is based on the terminal device's measurement report. However, the terminal device's measurement report may not indicate a need for handover, since the terminal device may have good connection with current DU/cell. In addition, the DU/cell does not broadcast the new Cell Global Identifier (CGI)/Physical Cell Identifier (PCI) over the air before the CU switch is completed. One may consider the handover may be based on the CU's implementation, but the CU may not know the target CU/DU for a specific satellite/DU. For example, in Iridium system, the satellites in adjacent planes move in opposite direction. In Integrated Access and Backhaul (IAB), the CU can determine need for the CU switch, based on the measurement report from IAB-MT, but the CU cannot know the "target DU", i.e. current DU becomes "target DU" after the CU switch.

Issue 2: How can the DU know when it is safe to stop the over the air transmission as "old DU" connecting to old CU, and starts the operation as "new DU" connecting to new CU? Since the RRC is terminated at the CU and the UE, the DU cannot know the RRC message is a RRC Reconfiguration message. If using current inter-DU handover procedure, the DU only knows that the UE has left upon the reception of the F1 UE CONTEXT RELEASE COMMAND message (Step 11 in FIG. 1 and FIG. 2). But this is not feasible in CU switch, since the DU has not started the operation as "new DU" yet, and the UE has not connected to "new DU" (Step 8, 9, 10 in FIG. 1 and FIG. 2). Without step 8/9/10, CU cannot inform DU that the UE is gone (Step 11 in FIG. 1 and FIG. 2), and can stop the transmission as "old DU".

Issue 3: Signaling efficiency. In the CU switch case, the terminal device's serving DU does not change. For example, in the non-terrestrial network example, it is the same satellite serving the terminal device, before the CU switch and after the CU switch, even the DU may change the identities, for example, gNB-DU identifier, Cell Global Identifier, Physical Cell Identifier, and the like, broadcasted over the air interface, after the DU connects to the new CU. In normal inter-DU handover, target CU initiates F1AP UE Context Setup procedure to target DU to setup the terminal device context. This is unnecessary and costly for CU Switch case, since it is the same DU serving the terminal devices, before the CU switch and after CU switch. The DU already has the context for the terminal device. Also, NTN has long delay for the transport between CU and DU, e.g. 25 ms for LEO with 600KM altitude. Initiating the F1AP UE Context Setup for all connected UEs is costly.

Therefore, a new solution for CU switch is needed. According to embodiments of the present disclosure, the DU transmits identity information of a target CU/DU and other F1AP UE context information to the source CU for the CU switch. The target CU does not need to initiate F1AP context setup procedure to set up the F1AP UE context for the terminal device. Thus, the CU switch is implemented with minimized signaling and interruption in the data connection and the switching is completed faster by avoiding the unnecessary F1AP context setup between the target CU and the DU.

Figure 3:
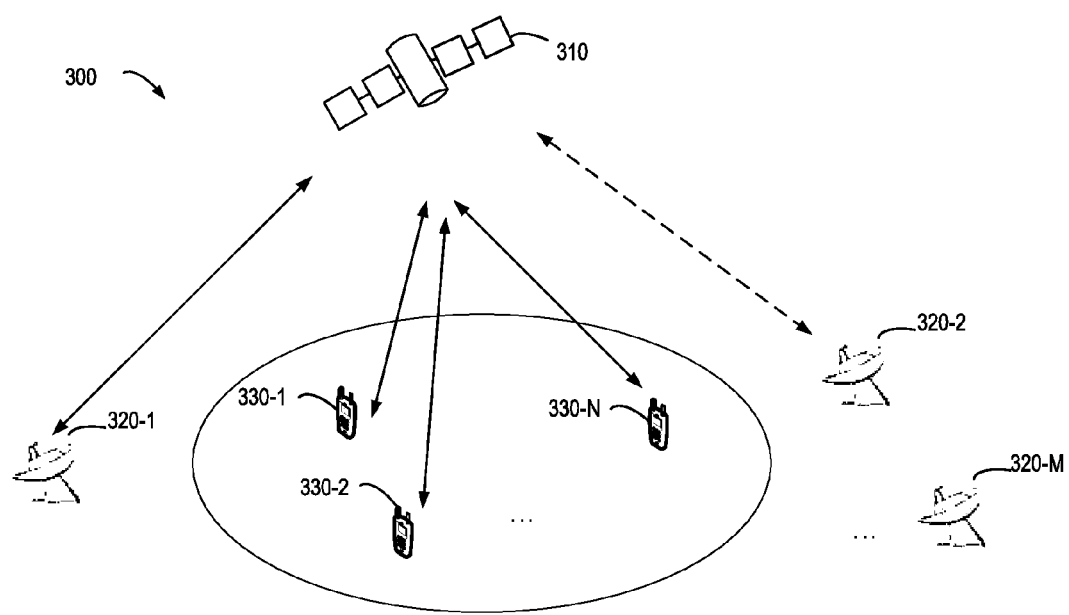
FIG. 3 illustrates a schematic diagram of a communication system according to embodiments of the present disclosure.

FIG. 3 illustrates a schematic diagram of a communication system 300 in which embodiments of the present disclosure can be implemented. The communication system 300, which is a part of a communication network, comprises a DU 310, CUs 320-1, 320-2, . . . , 320-M (collectively referred to as "CU 320" where M is an integer number), and terminal devices 330-1, 330-2, . . . , 330-N (collectively referred to as "terminal device(s) 330" where N is an integer number). It should be noted that the communication system 300 may also comprise other elements which are omitted for the purpose of clarity. As shown in FIG. 3, the CU 320-1 is currently serving the DU 310. The terminal devices 330 are currently communicating with the DU 310. Only for the purpose of illustrations, the DU is implemented at a satellite. It should be noted that the DU may be implemented at other devices.

It is to be understood that the numbers of terminal devices, CUs and DU shown in FIG. 3 are given for the purpose of illustration without suggesting any limitations. The communication system 300 may include any suitable number of network devices and terminal devices.

Communications in the communication system 300 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 4:
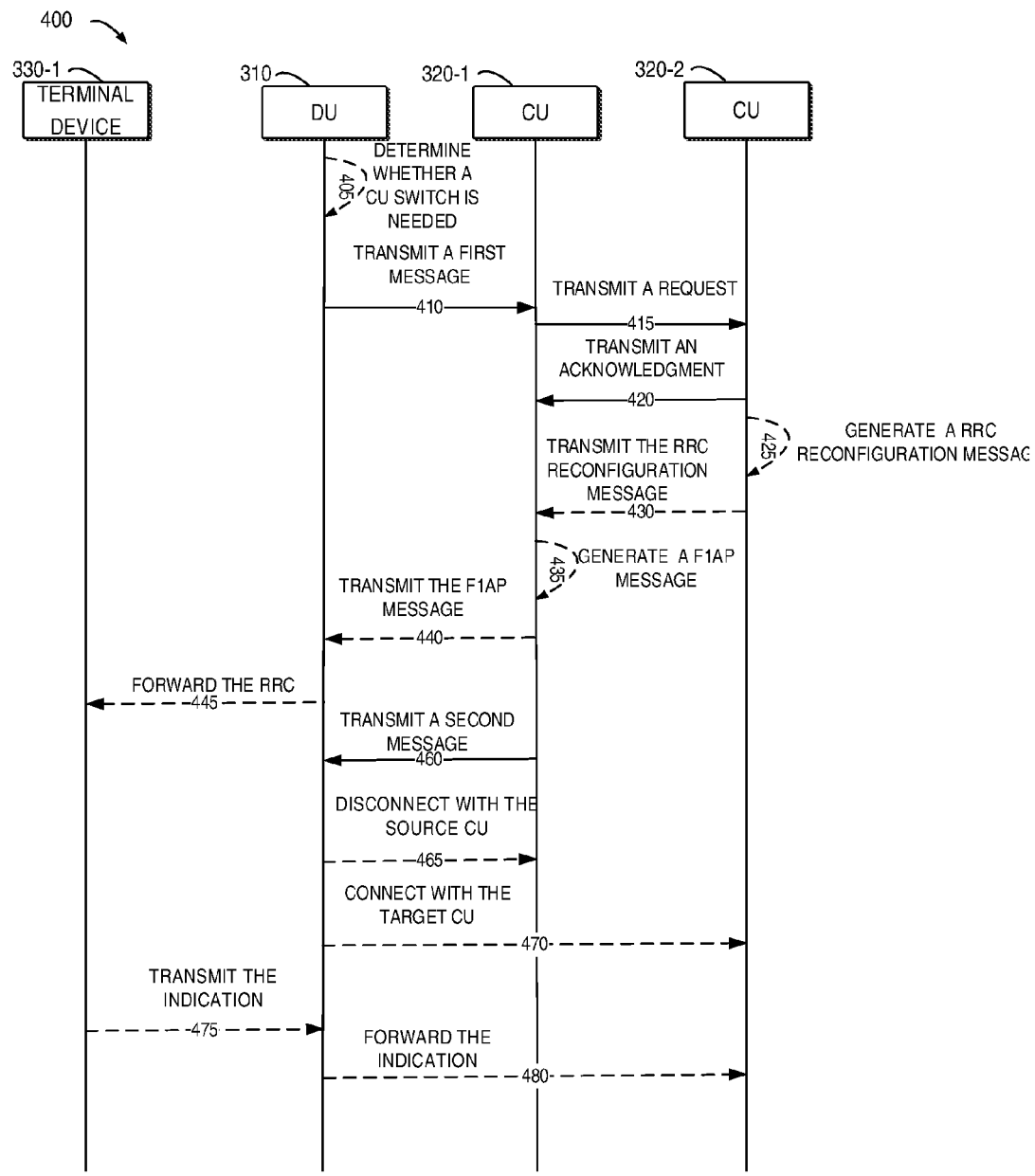
FIG. 4 illustrates a schematic diagrams of interactions of CU switch according to embodiments of the present disclosure.

FIG. 4 illustrates a schematic diagram of interactions 400 of CU switch according to embodiments of the present disclosure. It should be noted that embodiments of the present disclosure may be implemented in NTN systems. Embodiments of the present disclosure may also be implemented in other systems, for example, IAB systems. Only for the purpose of illustrations, the CU 320-1 is regarded as the source CU which is currently serving the DU 310 and the CU 320-2 is regarded as the target CU which the DU 310 is to switch to.

The DU 310 may determine 405 that it needs to switch from the source CU 320-1 to the target CU 320-2. The DU 310 may determine that the switch is needed if the distance between the DU 310 and the source CU 320-1 exceeds a threshold value. The DU 310 may determine that the switch is needed based on other criteria, for example, the DU 310 may determine whether the switch is needed based on its trajectory and (relative) location of the ground stations hosting the source CU. In some embodiments, the radio conditions on satellite radio interface (SRI) or more generally the radio conditions on the radio link, or the quality of the interface between the DU 310 and the source CU 320-1 may trigger the change. If the radio condition or quality of the interface is below a threshold value, the DU 310 may determine that the CU switch is needed. Alternatively, the entity where the DU 310 is located may have means for measurements and may measure the radio link quality to both source CU 320-1 and target CU 320-2 and trigger the switch when the target CU 320-2 radio link becomes better than the source CU 310-1 radio link.

Alternatively, the DU 310 may be preconfigured with information regarding when it needs to switch to target CU 320-2 by the operation and management (OAM). Alternatively, the source CU 320-1 may be preconfigured with information regarding when the DU 310 should be switched to target CU 320-2, or the source CU 320-1 may receive the information from the DU 310 regarding when the DU 310 should be switched to target CU 320-2. In IAB case, the source CU 320-1 may determine the need for CU 310 switch based on the IAB-MT's measurement report.

Alternatively, the source CU 320-1 may determine the need for the CU switch and send a message to the DU 310 to indicate the need for CU switch as well as request the DU 310 to provide a first message as described below.

The DU 310 transmits 410 a message (also referred to as "the first message" hereinafter) to the source CU 320-1. The first message from the DU 310 to the source CU 320-1 provides the information for switching from the source CU 320-1 to target CU 320-2. In one embodiment, DU 310 may send the first message to the source CU 320-1 early before the CU switch, for example, during the F1 Setup procedure or gNB-DU Configuration Update procedure. The source CU 320-1 may consider the received information when it determines a CU switch is needed later. In another embodiment, the DU 310 may send the first message to the source CU 320-1 just before the CU switch, for example, when the DU 310 detects a need for CU switch. The source CU 320-1 may consider the received information to perform a CU switch. In another embodiment, the first message may be a response message to a request sent by the source CU in case the CU determines the need for the CU switch. In satellite environment where the DU is in a satellite, if the DU initiates the switch, the extra latency due to message transfer for the CU to DU can be avoided. The first message comprises identity information of the target CU 320-2. The first message may also comprise identity information of the DU 310, for example, the identity to be used by the DU 310 after it connects to target CU 320-2, for example, the DU 310 may changes its gNB-DU identity, Cell Global Identifier or Physical Cell Identifier or any other identity after DU 310 completes CU switch. For simplicity reason, the DU after the CU switch is still considered as the DU 310, even the DU may use a different identity after the CU switch. This does not prevent to rename it as a new DU due to the new identity. In this way, the target CU 320-2 knows the related DU 310 after the CU switch is completed. The first message may comprise one of the following or any proper combinations: an Internet Protocol (IP) address of the target CU 320-2, an identity (ID) of the target CU 320-2, or a name of the target CU 320-2, an identity (ID) of the target DU. The first message may also comprise a duration of the DU 310 staying in the source CU 320-1, for example, when the DU 310 sends the first message early before the CU switch. The source CU 320-1 may know when the CU switch is needed based on the received duration information. Furthermore, the first message may contain RRC container(s) including the lower layer (DU) RRC configuration(s), which can be used by the target CU to generate a RRC message, for example, RRC Reconfiguration message, to be sent to the UE(s)/terminal device(s) 330 connected with DU 310.

The source CU 320-1 may determine to initiate a handover preparation procedure for all terminal devices 330 connected with DU 310. The source CU 320-1 transmits 415 a (handover) request (also referred to as "the request" hereinafter) to the target CU 320-2, for instance using XnAP (for Xn-based handover) or NGAP (for NG-based handover). The request comprises an indication that the handover for terminal devices is triggered due to CU switch. The request may also comprise the RRC container(s) including the lower layer (DU) RRC configuration(s), which can be used by the target CU 320-2 to generate a RRC message, for example, RRCReconfiguration message, to be sent to the UE(s)/terminal device(s) 330 connected with DU 310, as well as the UE F1AP context information. The request may also comprise the ID of the UE, for example, DU UE F1AP ID. In this way, the target CU 320-2 may not initiate F1AP UE Context Setup procedure and not send a F1 Application Protocol (AP) UE CONTEXT SETUP REQUEST message to the DU, for example, the DU 310. The target CU 320-2 may also skip the admission control and other procedures, as required for conventional inter-CU handover. In this way, signaling between the target CU 320-2 and the DU 310 has been reduced. This is different from the normal handover preparation procedure. In this invention, the handover is triggered by the DU 310, or determined by the CU 320-1 but with assistance information from the DU 310.

The request may also comprise the identity of the DU 310, for example, the Cell Global Identifier, the Physical Cell Identifier, the DU name, and the like, to be used by the DU 310 after the CU switch. The request may also comprise an indication that the handover for terminal device is trigger by the DU 310. In this way, the target CU 320-2 is able to recognize the DU 310 to which the F1 is set up during the CU switching procedure.

In some embodiments, the request may also comprise the UE F1AP context information in the source CU 320-1 including any updates provided by the DU 310 in the first message. In this way, the target CU 320-2 knows the UE F1AP Context, without the need for target CU 320-2 to initiate F1AP UE Context Setup procedure with the DU 310.

The F1AP UE Context information may comprise following information, for example, the context information that the source CU 320-1 knows during the F1AP UE Context Setup/Modification procedure with the DU 310. Table 1 below shows an example of F1AP UE Context information.

TABLE 1

| | | | | | | |
|---|---|---|---|---|---|---|
| gNB-CU UE F1AP ID | M | | 9.3.1.4 | | YES | reject |
| gNB-DU UE F1AP ID | M | | 9.3.1.5 | | YES | reject |
| DU To CU RRC Information | M | | 9.3.1.26 | | YES | reject |
| C-RNTI | O | | 9.3.1.32 | C-RNTI allocated at the gNB-DU | YES | ignore |
| Resource Coordination Transfer Container | O | | OCTET STRING | Includes the SgNB Resource Coordination Information IE as defined in subclause 9.2.117 of TS 36.423 [9]. | YES | ignore |
| Full Configuration | O | | ENUMERATED (full, . . .) | | YES | reject |
| DRB Setup List | | 0 . . . 1 | | The List of DRBs which are successfully established. | YES | ignore |
| >DRB Setup Item list | | 1 . . . <maxnoofDRBs> | | | EACH | ignore |
| >>DRB ID | M | | 9.3.1.8 | | — | |
| >>LCID | O | | 9.3.1.35 | LCID for the primary path if PDCP duplication is applied | | |
| >>DL UP TNL Information to be setup List | | 1 | | | | |
| >>> DL UP TNL Information to Be Setup Item IEs | | 1 . . . <maxnoofDLUPTNLInformation> | | | | |
| >>>>DL UP TNL Information | M | | UP Transport Layer Information 9.3.2.1 | gNB-DU endpoint of the F1 transport bearer. For delivery of DL PDUs. | | |
| Inactivity Monitoring Response | O | | ENUMERATED (not-supported, . . .) | | YES | reject |

The target CU 320-2 transmits 420 an acknowledgement to the source CU 320-1. In some embodiments, the acknowledgement may be an XnAP message (for Xn-based handover). Alternatively, the acknowledgement 420 may be a NGAP message (for a NG-based handover). The acknowledgement may comprise the updated F1AP UE context, for example, new gNB-CU UE F1AP ID allocated by the target CU 320-2, or DRBs to be setup, or any other F1AP UE context. It is also possible that the target CU 320-2 use the same F1AP UE context as the source CU 320-1, for example, the same gNB-CU UE F1AP ID as the source CU 320-1, when the gNB-CU UE F1AP ID is not allocated for other UE in the target CU 320-2. Alternatively or in addition, the acknowledgement may also comprise gNB-DU UE F1AP ID.

The target CU 320-2 may generate 425 a Radio Resource Control (RRC) reconfiguration message or messages including the lower layer (DU) RRC configuration(s) provided in the request as well as the higher layer (CU) RRC configuration(s) generated by the target CU 320-2. The target CU 320-2 may transmit 430 the RRC reconfiguration message to the source CU 320-1 using an appropriate XnAP message (for Xn-based handover), or an appropriate NGAP message (for NG-based handover). Alternatively, the RRC reconfiguration message may be sent as an RRC container within the acknowledgement 420 using an appropriate XnAP message (for Xn-based handover), or an appropriate NGAP message (for NG-based handover).

In an example embodiment, the source CU 320-1 may obtain the identity of F1AP from the acknowledgement received from the target CU 320-2. The source CU 320-1 may generate 435 a F1AP message including the RRC reconfiguration message, as well as the updated F1AP UE context, for example, the identity of F1AP, received from target CU 320-2.

The source CU 320-1 transmit 440 the generated F1AP message to the DU 310. The DU 310 may forward 445 the RRC reconfiguration message to the terminal device 330-1. The DU 310 may store the updated F1AP UE context, and use it after the DU 310 connects to target CU 320-2. The source CU 320-1 may transmit the RRC reconfiguration messages for all the terminal devices 330 to the DU 310 typically as separate F1AP UE CONTEXT MODIFICATION REQUEST messages. The DU 310 may forward the RRC reconfiguration messages to all the terminal devices 330.

In an example embodiment, after the source CU 320-1 determines that the RRC reconfiguration message and updated F1AP UE context has been transmitted for all terminal devices 330, the source CU 320-1 may transmit 460 the second message to the DU 310. The second message indicates the DU 310 to switch to target CU 320-2. Upon the reception of the second message from the source CU 320-1, DU 310 is now safe to turn off the air transmission, disconnect from CU 320-1 and connect to CU 320-2 and turn again on the air transmission. In this way, a reliable CU change can be achieved. In some embodiments, transmitting the generated F1AP message and the second message may be combined. In that case the DU 310 can switch the CU after forwarding the RRC messages to the terminal devices 330.

The DU 310 switches the F1 connection with the source CU 320-1 to the target CU 320-2. The DU 310 may disconnect 465 with the source CU 320-1 and connect 470 with the target CU 320-2. In some embodiments, the DU 310 may establish the transport protocol, for example, establish the Stream Control Transmission Protocol (SCTP) association, and setup F1AP with the target CU 320-2. Alternatively, the F1AP with the target CU 320-2 may be setup previously, for example, using a separate DU on the same satellite.

In some embodiments, after the DU has connected to the target CU, the terminal device 330-1 may transmit 475 an indication that RRC reconfiguration is completed by the terminal device 330-1. The DU 310 may forward 480 the indication to the target CU 320-2. The normal handover procedure follows, for example, from Step 10 in FIG. 1.

In some embodiments, at Step 410: the DU 310 initiates the indication for CU switch. The satellite may be preconfigured by the OAM regarding when it needs to switch to target CU, and the information of target CU, for example, IP address of target CU 320-2, the ID or name of target CU 320-2, how long it remains in the CU's coverage, the identity to be used by the DU after the CU switch, and the like. The indication message may comprise IP address of target CU 320-2, the ID or name of target CU 320-2, how long it remains in the CU's coverage, the identity to be used by the DU after the CU switch, and the like.

The satellite carrying the DU 310 may initiate the CU change procedure also based on its trajectory and (relative) location of the ground stations hosting the CUs.

Alternatively, the radio conditions on SRI may trigger the change. Or in addition, the CU 320-1 may be assisted by the DU 310, for example, the DU 310 provides the ID of target CU 320-2.

The CU switch indication may also comprise the target DU ID, i.e., the one used by the source DU after the CU switch. This enables the target CU 320-2 to know the related DU 310 after the CU switch is completed.

NOTE: In IAB case, the source CU 320-1 may determine the need for CU switch based on the IAB-MT's measurement report, but still need this step to tell CU about the target DU ID for the UE (e.g., gNB-DU ID), F1AP UE context as well as to receive the lower layer RRC configuration to be provided to the UE(s) in the RRC reconfiguration message.

At Step 415: Upon the reception of CU Switch indication message from the DU 310, the source CU 320-1 may determine the need to initiate handover preparation procedure for all connected UEs. The source CU 320-1 may send Xn HANDOVER REQUEST message (for Xn-based handover) to the target CU 320-2, or send NGAP HANDOVER REQUIRED message (for NG-based handover) to the target CU 320-2 via core network. The Xn HANDOVER REQUEST message or NGAP HANDOVER REQUIRED message includes an indication that the handover is triggered due to CU switch. By recognizing this indication, the target CU 320-2 may not send F1AP UE CONTEXT REQUEST to the DU 310, and may skip the admission control and other procedures, as normally required for inter-CU handover. The Xn HANDOVER REQUEST message NGAP HANDOVER REQUIRED message also includes the target DU ID, so that the target CU 320-1 can recognize the DU 310 to which the F1 is set up during the CU switching procedure. In this case, this ID is the identity to be used by DU 310 after the CU switch.

The Xn HANDOVER REQUEST message or NGAP HANDOVER REQUIRED message may also comprise the F1AP context for the UE, e.g. DU UE F1AP ID. This ensures target CU 320-2 can identify the same UE after CU switch, i.e. after DU 310 connects to target CU 320-2.

During the Handover Preparation procedure, the target CU 320-2 may generate a RRC Reconfiguration message, and send it back to the source CU 320-1. The Xn HANDOVER REQUEST ACKNOWLEDGE message or NGAP HANDOVER COMMAND message may also contain the F1AP UE context including gNB-CU UE F1AP ID, and gNB-DU UE F1AP ID, e.g. the target CU 320-2 may reallocate a new gNB-CU UE F1AP ID when the current gNB-CU UE F1AP ID is already allocated for some other UE.

Figure 5:
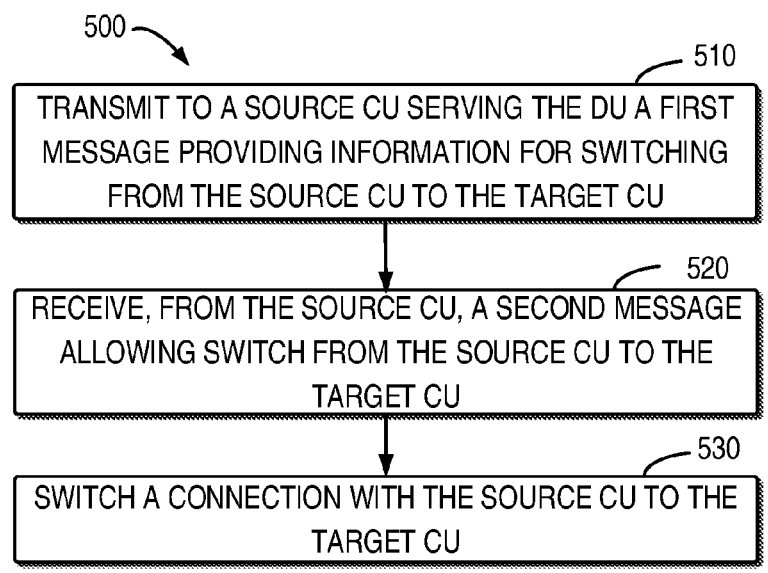
FIG. 5 illustrates a flow chart of a method according to embodiments of the present disclosure.

FIG. 5 illustrates a flow chart of a method 500 in accordance with embodiments of the present disclosure. The method 500 may be implemented at any suitable DUs. Only for the purpose of illustrations, the method 500 is described to be implemented at the DU 310.

At block 510, the DU 310 transmits to the source CU 320-1 a first message providing the information for the switching from the source CU 320-1 to the target CU 320-2 if a CU switch is needed. The DU 310 may determine that the switch is needed if the distance between the DU 310 and the source CU 320-1 exceeds a threshold value. The DU 310 may determine that the switch is needed based on other criteria, for example, the DU 310 may determine whether the switch is needed based on its trajectory and (relative) location of the ground stations hosting the source CU. In some embodiments, the radio conditions on the radio link or the quality of the interface between the DU 310 and the source CU 320-1 may trigger the change. If the radio condition or quality of the interface is below a threshold value, the DU 310 may determine that the CU switch is needed. Alternatively, the entity where the DU 310 is located may have means for measurements and may measure the radio link quality to both source CU 320-1 and target CU 320-2 and trigger the switch when the target CU 320-2 radio link becomes better than the source CU 310-1 radio link.

Alternatively, the DU 310 may be preconfigured with information regarding when it needs to switch to target CU 320-2 by the operation and management (OAM). In IAB case, the source CU 320-1 may determine the need for CU 310 switch based on the LAB-MT's measurement report.

Alternatively, the DU 310 may receive a request from CU 320-1, requesting DU 310 to send a first message.

The first message may comprise identity information of the target CU 320-2 and DU. For example, the first message may comprise one of the following or any proper combinations: an Internet Protocol (IP) address of the target CU 320-2, an identity (ID) of the target CU 320-2, or a name of the target CU 320-2, or an identity (ID) of the DU to be used after the CU switch. The first message may also comprise a duration of the DU 310 staying in the source CU 320-1 or when the CU switch is needed. The first message may also comprise RRC container(s) including the lower layer (DU) RRC configuration(s), which can be used by the CU to generate a RRC message, for example, RRCReconfiguration message, to be sent to the UE(s)/terminal device(s) 330 connected with DU 310.

In some embodiments, the DU 310 may receive, from the source CU 320-1, the F1AP message, for example, the UE CONTEXT MODIFICATION REQUEST message, containing RRC reconfiguration message generated by the target CU 320-2 as well as the F1AP UE context updated by target CU 320-2. The DU 310 may forward the RRC reconfiguration message to the terminal device 330-1. The DU 310 may save the updated F1AP UE context and may use it after the DU 310 connects to target CU 320-2. The DU 310 may receive the F1AP message(s), for example, the UE CONTEXT MODIFICATION REQUEST message(s), containing the RRC reconfiguration message and updated F1AP UE context for all the terminal devices 330 from the source CU 320-1. The DU 310 may forward the RRC reconfiguration message to all the terminal devices 330.

At block 520, the DU 310 receives, from the source CU 320-1, a second message allowing DU 310 to switch from the source CU 320-1 to the target CU 320-2. In some embodiments, after the source CU 320-1 determines that the RRC reconfiguration message has been transmitted for all connected UEs, the DU 310 may receive the second message from the CU 320-1. The second message may indicate the DU 310 to switch to target CU 320-2.

At block 530, the DU 310 switches a connection with the source CU 320-1 to the target CU 320-2. The DU 310 may disconnect 465 with the source CU 320-1 and connect 470 with the target CU 320-2. In some embodiments, the DU 310 may setup F1AP with the target CU 320-2. The F1AP may be setup for example, using a separate DU on the same satellite. After the DU 310 connects to target CU 320-2, the DU 310 may use the saved F1AP UE context for the UEs.

In some embodiments, the terminal device 330-1 may transmit an indication that RRC reconfiguration is completed by the terminal device 330-1. The DU 310 may forward the indication to the target CU 320-2.

In some embodiments, an apparatus for performing the method 500 (for example, the DU 310) may comprise respective means for performing the corresponding steps in the method 500. These means may be implemented in any suitable manners. For example, it can be implemented by circuitry or software modules.

In some embodiments, the apparatus comprises: means for in response to a determination at a distributed unit (DU) to provide information for a centralized unit (CU) switch, transmitting to a source CU serving the DU a first message providing the information for switching from the source CU to a target CU; means for receiving, from the source CU, a second message allowing switch from the source CU to the target CU; and means for switching a connection with the source CU to the target CU.

In some embodiments, the first message comprises at least one of: an Internet Protocol (IP) address of the target CU, an identity (ID) of the target CU, a name of the target CU, an identity of the DU, a duration of connecting with the source CU, or RRC container including the UE lower layer (DU) RRC configuration.

In some embodiments, providing the information for the CU switch is determined to be needed in response to at least one of the following: a determination that a distance between a location of the DU and a location of the CU exceeds a threshold distance, a determination that quality on an interface between the DU and the CU is below a threshold value, a preconfigured timing, or a message received from the source CU indicating the information for CU switch is needed.

In some embodiments, the apparatus further comprises: means for receiving a F1 application (F1AP) message from the source CU, the F1AP message comprising Radio Resource Control (RRC) reconfiguration message and a F1AP UE context; means for storing the F1AP UE context; and means for forwarding the RRC reconfiguration message to a terminal device connecting with the DU.

In some embodiments, the apparatus further comprises: means for utilizing the F1AP UE context after switching the connection form the source CU to the target CU.

Figure 6:
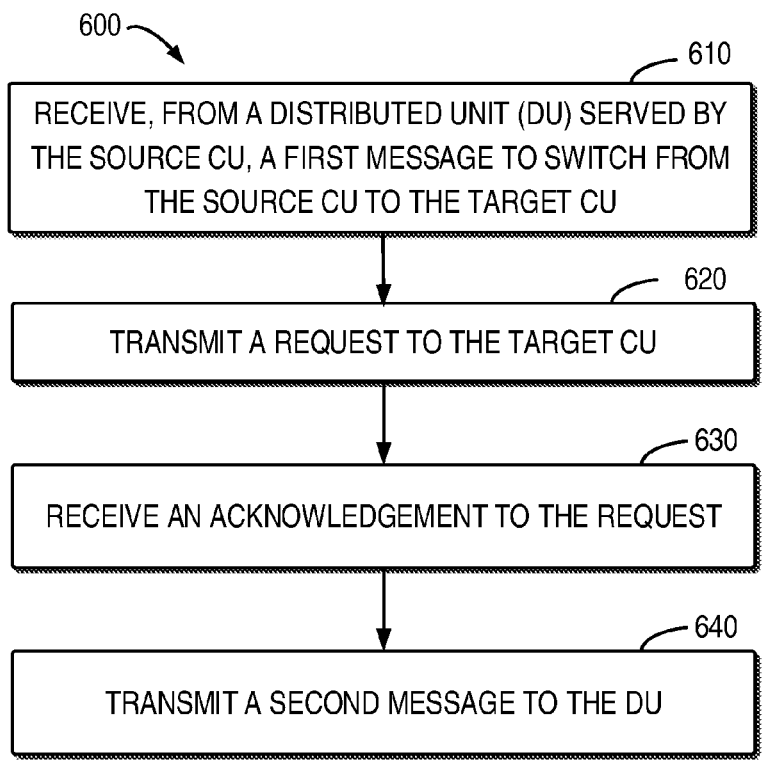
FIG. 6 illustrates a flow chart of a method according to embodiments of the present disclosure.

FIG. 6 illustrates a flow chart of a method 600 in accordance with embodiments of the present disclosure. The method 600 may be implemented at any suitable CUs. Only for the purpose of illustrations, the method 600 is described to be implemented at the source CU 320-1.

At block 610, the source CU 320-1 receives a first message from the DU 310. The first message provides the information for the switching from the source CU 320-1 to the target CU 320-2. The first message may comprise identity information of the target CU 320-2 and the identify information to be used by DU 310 after it connects to CU 320-2. For example, the first message may comprise one of the following or any proper combinations: an Internet Protocol (IP) address of the target CU 320-2, an identity (ID) of the target CU 320-2, a name of the target CU 320-2, or the identify information to be used by DU 310 after it connects to CU 320-2. The first message may also comprise a duration of the DU 310 staying in the source CU 320-1 or when the CU switch is needed. The first message may also comprise RRC container(s) including the lower layer (DU) RRC configuration(s), which can be used by the CU to generate a RRC message, for example, RRCReconfiguration message, to be sent to the UE(s)/terminal device(s) 330 connected with DU 310. The first message may also comprise UE Context information or UE ID in the DU (for example gNB-DU UE F1AP ID) to be used after the CU switch.

At block 620, the source CU 320-1 transmits a request to the target CU 320-2. In some embodiments, the request comprises an indication that the switch is triggered due to CU switch. Alternatively, the request may also comprise the ID of the DU, for example, the identity to be used by the DU 310 after the CU switch. In some embodiments, the request may also comprise the UE F1AP context information in the source CU 320-1.

The source CU 320-1 may transmit the request to the target CU 320-2, for instance using XnAP (for Xn-based handover) or NGAP (for NG-based handover). The request comprises an indication that the handover for terminal devices is triggered due to CU switch. The request may also comprise the RRC container(s) including the lower layer (DU) RRC configuration(s) to be sent to the UE(s)/terminal device(s) 330 connected with DU 310 as well as the F1AP UE context information. The request may also comprise the ID of the UE, for example, DU UE F1AP ID. In this way, the target CU 320-2 may not initiate F1AP UE Context Setup procedure and not send a F1 Application Protocol (AP) UE CONTEXT SETUP REQUEST message to the DU 310.

At block 630, the source CU 320-1 receives an acknowledgment to the request. The acknowledgement may comprise the updated F1AP UE context, for example, new gNB-CU UE F1AP ID allocated by the target CU 320-2. Alternatively or in addition, the acknowledgement may also comprise gNB-DU UE F1AP ID. Alternatively, the RRC reconfiguration message may be sent as an RRC container within the acknowledgement 420 using an appropriate XnAP message (for Xn-based handover), or an appropriate NGAP message (for NG-based handover).

In an example embodiment, the source CU 320-1 may obtain the identity of F1AP from the acknowledgement received from the target CU 320-2. The source CU 320-1 may generate a F1AP message including the RRC reconfiguration message, as well as the updated F1AP UE context, for example, the identity of F1AP received from target CU 320-2.

The source CU 320-1 may transmit the generated FLAP message to the DU 310. The DU 310 may forward the RRC reconfiguration message to the terminal device 330-1. The source CU 320-1 may transmit the RRC reconfiguration message for all the terminal devices 330 to the DU 310 typically as separate F1AP UE CONTEXT MODIFICATION REQUEST messages. The DU 310 may forward the RRC reconfiguration message to all the terminal devices 330.

At block 640, the source CU 320-1 transmits a second message to the DU 310. In an example embodiment, after the source CU 320-1 determines that the RRC reconfiguration message has been transmitted for all terminal devices 330, the source CU 320-1 may transmit 460 the second message to the DU 310. The second message may indicate the DU 310 to switch to target CU 320-2. In some embodiments, messages 440 and 460 may be combined.

In some embodiments, an apparatus for performing the method 600 (for example, the source CU 320-1) may comprise respective means for performing the corresponding steps in the method 600. These means may be implemented in any suitable manners. For example, it can be implemented by circuitry or software modules.

In some embodiments, the apparatus comprises: means for receiving, at a source centralized unit (CU) and from a distributed unit (DU) served by the source CU, a first message to switch from the source CU to a target CU, the first message providing information for switching from the source CU to a target CU; means for transmitting to the target CU a request indicating the switching from the source CU to the target CU; means for receiving an acknowledgement to the request from the CU target, and means for transmitting a second message to the DU, the second message allowing the DU to switch from the source CU to the target CU.

In some embodiments, the first message comprises at least one of: an Internet Protocol (IP) address of the target CU, an identity (ID) of the target CU, a name of the target CU, a duration of connecting with the source CU, an identity (ID) of the DU or a RRC container.

In some embodiments, the request further comprises at least one of: an identity of the DU, F1AP UE context information, or a RRC container.

In some embodiments, the apparatus further comprises means for receiving, from the target CU, an acknowledgement message comprising a Radio Resource Control (RRC) reconfiguration message generated by the target CU and a F1AP UE context; means for generating a F1AP message comprising the RRC reconfiguration message and the F1AP UE context obtained from the acknowledgement message; means for transmitting the generated F1AP message to the DU.

In some embodiments, the acknowledgement comprises at least one of: gNB-CU UE F1AP ID, gNB-DU UE F1AP ID, any other F1AP UE context, or a RRC container.

Figure 7:
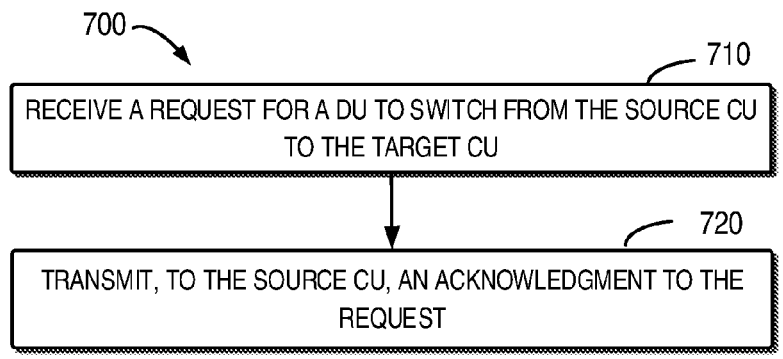
FIG. 7 illustrates a flow chart of a method according to embodiments of the present disclosure.

FIG. 7 illustrates a flow chart of a method 700 in accordance with embodiments of the present disclosure. The method 700 may be implemented at any suitable CUs. Only for the purpose of illustrations, the method 700 is described to be implemented at the target CU 320-2.

At block 710, the target CU 320-2 receives the request for the switch from the source CU 320-1 to the target CU 320-2. The request comprises an indication that the switch is triggered due to CU switch. In this way, the target CU 320-2 may not initiate a F1AP UE Context Setup procedure to the DU 310. The target CU 320-2 may also skip the admission control and other procedures, as required for conventional inter-CU handover. In this way, signaling between the target CU 320-2 and the DU 310 has been reduced.

The request may be received, for instance, using XnAP (for Xn-based handover) or NGAP (for NG-based handover). The request comprises an indication that the handover for terminal devices is triggered due to CU switch. The request may also comprise the RRC container(s) including the lower layer (DU) RRC configuration(s) to be sent to the UE(s)/terminal device(s) 330 connected with DU 310 as well as the UE F1AP context information. The request may also comprise the ID of the UE, for example, DU UE F1AP ID. In this way, the target CU 320-2 may not initiate F1AP UE Context Setup procedure and not send a F1 Application Protocol (AP) UE CONTEXT SETUP REQUEST message to the DU 310.

The request may also comprise the ID of the DU 310, for example, the ID of the DU, the Cell Global Identifier, Physical Cell Identifier, or the DU name. The request may also comprise an indication that the handover for terminal device is trigger by the DU 310. In this way, the target CU 320-2 is able to recognize the DU 310 to which the F1 is set up after the DU 310 connects to target CU 320-2.

In some embodiments, the request may also comprise the UE F1AP context information in the source CU 320-1. In this way, the target CU 320-2 knows the UE F1AP Context, without the need for target CU 320-2 to initiate F1AP UE Context Setup procedure with the DU 310.

The F1AP UE Context information may comprise following information, for example, the context information that the source CU 320-1 knows during the F1AP UE Context Setup/Modification procedure.

At block 720, the target CU 320-2 transmits the acknowledgement to the request to the source CU 320-1. In some embodiments, the acknowledgement may be an XnAP message (for Xn-based handover). Alternatively, the acknowledgement may be a NGAP message (for a NG-based handover). The acknowledgement may comprise the new gNB-CU UE F1AP ID allocated by the target CU 320-2, or any updated UE F1AP context information. It is also possible that the target CU 320-2 use the same gNB-CU UE F1AP ID as the source CU 320-1, for example, the gNB-CU UE F1AP ID is not allocated for other UE in the target CU 320-2. Alternatively or in addition, the acknowledgement may also comprise gNB-DU UE F1AP ID.

In some embodiments, the target CU 320-2 may generate a Radio Resource Control (RRC) reconfiguration message or messages including the lower layer (DU) RRC configuration(s) provided in the request as well as the higher layer RRC configuration provided by the target CU 320-2. The target CU 320-2 may transmit 430 the RRC reconfiguration message to the source CU 320-1 using an appropriate XnAP message (for Xn-based handover), or an appropriate NGAP message (for NG-based handover). Alternatively, the RRC reconfiguration message may be sent as an RRC container within the acknowledgement 420 using an appropriate XnAP message (for Xn-based handover), or an appropriate NGAP message (for NG-based handover).

In some embodiments, an apparatus for performing the method 700 (for example, the target CU 320-2) may comprise respective means for performing the corresponding steps in the method 700. These means may be implemented in any suitable manners. For example, it can be implemented by circuitry or software modules.

In some embodiments, the apparatus comprises: means for receiving, at a target centralized unit (CU), a request for a distributed unit (DU) to switch from a source CU to the target CU and means for transmitting, to the source CU, an acknowledgment to the request.

In some embodiments, the request further comprises at least one of: an indication that the handover for terminal device is trigger by the DU 310, an identity of the DU, F1AP UE context information in the source CU, or a RRC container.

In some embodiments, the apparatus further comprises: means for storing the F1AP UE context information received in the request; means for generating a Radio Resource Control (RRC) reconfiguration message; means for updating the UE F1AP context.

In some embodiments, the acknowledgement comprises at least one of: gNB-CU UE F1AP ID, or gNB-DU UE F1AP ID, or any other UE F1AP context information.

Figure 8:
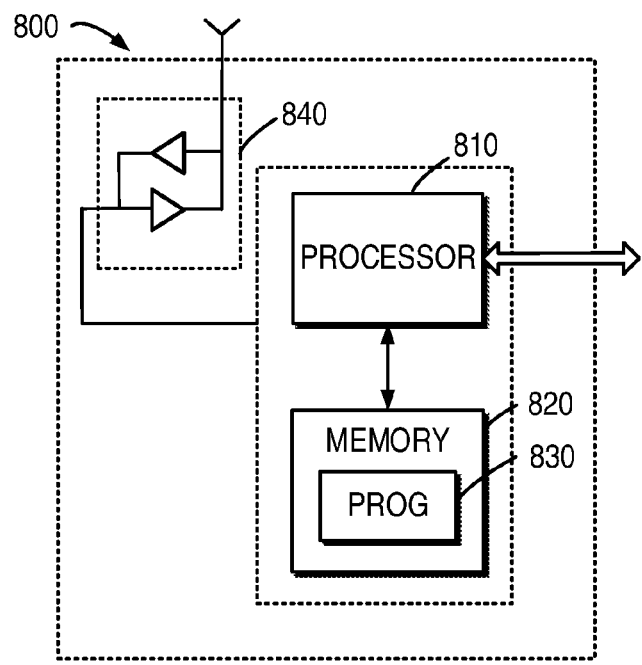
FIG. 8 illustrates a schematic diagram of a device according to embodiments of the present disclosure.

FIG. 8 is a simplified block diagram of a device 800 that is suitable for implementing embodiments of the present disclosure. The device 800 may also be implemented at the DU 310. The device 700 may also be implemented at the CUs 320. As shown, the device 800 includes one or more processors 810, one or more memories 820 coupled to the processor(s) 810, one or more transmitters and/or receivers (TX/RX) 840 coupled to the processor 810.

The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 820 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements.

The program 830 is assumed to include program instructions that, when executed by the associated processor 810, enable the device 800 to operate in accordance with the embodiments of the present disclosure, as discussed herein with reference to FIGS. 4, 5, 6 and 7. That is, embodiments of the present disclosure can be implemented by computer software executable by the processor 810 of the device 800, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. An apparatus, comprising:
   at least one processor; and
   a at least one memory coupled to the at least one processor, the at least one memory storing instructions therein, the instructions, when executed by the at least one processor, causing the apparatus to:
   in response to a determination at a distributed unit to provide information for a centralized unit switch, transmit to a source centralized unit serving the distributed unit a first message providing the information for switching from the source centralized unit to a target centralized unit,
   wherein the first message comprises at least one of: an Internet Protocol address of the target centralized unit, an identity of the target centralized unit, a name of the target centralized unit, a duration of connecting with the source centralized unit, or an identity of the distributed unit;
   receive, from the source centralized unit, a second message allowing switch from the source centralized unit to the target centralized unit; and
   switch a connection with the source centralized unit to the target centralized unit.

2. The apparatus of claim 1, wherein the first message comprises a radio resource control container.

3. The apparatus of claim 1, wherein providing the information for centralized unit switch is determined to be needed in response to at least one of the following:
   a determination that a distance between a location of the distributed unit and a location of the centralized unit exceeds a threshold distance, a determination that the quality on an interface between the distributed unit and the centralized unit is below a threshold value, a preconfigured timing, or a message received from the source centralized unit indicating the information for centralized unit switch is needed.

4. The apparatus of claim 1, wherein the apparatus is further caused to:
   receive a front-haul application protocol (F1AP) message from the source centralized unit, the F1AP message comprising a radio resource control reconfiguration message and a F1AP user equipment context; store the F1AP user equipment context; and
   forward the radio resource control reconfiguration message to a terminal device connecting with the distributed unit.

5. The apparatus of claim 4, wherein the apparatus is further caused to: utilize the stored F1AP user equipment context after switching the connection from the source centralized unit to the target centralized unit.

6. The apparatus of claim 1, wherein the distributed unit is on a satellite or the distributed unit is an integrated access and backhaul node.

7. An apparatus, comprising:
   at least one processor; and
   a at least one memory coupled to the at least one processor, the at least one memory storing instructions therein, the instructions, when executed by the at least one processor, cause the apparatus to:
   receive, at a source centralized unit and from a distributed unit served by the source centralized unit, a first message providing information for switching from the source centralized unit to a target centralized unit; transmit to the target centralized unit a request indicating the switching from the source centralized unit to the target centralized unit,
   wherein the first message comprises at least one of: an Internet Protocol address of the target centralized unit, an identity of the target centralized unit, a name of the target centralized unit, a duration of connecting with the source centralized unit, or an identity of the distributed unit;
   receive an acknowledgement to the request from the target centralized unit; and
   transmit a second message to the distributed unit, the second message allowing the distributed unit to switch from the source centralized unit to the target centralized unit.

8. The apparatus of claim 7, wherein the centralized unit switch is determined to be needed in response to at least one of the following:
   a determination that a distance between a location of the distributed unit and a location of the centralized unit exceeds a threshold distance, a determination that the quality on an interface between the distributed unit and the centralized unit is below a threshold value, a preconfigured timing, or the information provided in the first message received from the distributed unit.

9. The apparatus of claim 7, wherein the first message comprises a Radio Resource Control container.

10. The apparatus of claim 7, wherein the request further comprises at least one of:
    an indication that a handover for terminal device is triggered due to centralized unit switch, an identity of the distributed unit, F1AP user equipment context information, or a radio resource control container.

11. The apparatus of claim 7, wherein the apparatus is further caused to:
    receive, from the target centralized unit, an acknowledgement message comprising an radio resource control reconfiguration message generated by the target centralized unit and a F1AP user equipment context;
    generate a F1AP message comprising the radio resource control reconfiguration message and the F1AP user equipment context obtained from the acknowledgement message; and transmit the generated F1AP message to the distributed unit.

12. The apparatus of claim 7, wherein the acknowledgement comprises at least one of: a centralized unit user equipment F1AP identifier, a distributed unit user equipment F1AP identifier, any other F1AP user equipment context, or a radio resource control container.

13. The apparatus of claim 7, wherein the distributed unit is on a satellite or the distributed unit is an integrated access and backhaul node.

14. The apparatus of claim 7, wherein the centralized unit is on a ground.

15. A apparatus, comprising:
at least one processor; and
a at least one memory coupled to the at least one processor, the at least one memory storing instructions therein, the instructions, when executed by the at least one processor, cause the apparatus to:
receive, at a target centralized unit, a request for a distributed unit to switch based on a first message from a source centralized unit to the target centralized unit, wherein the first message comprises at least one of: an Internet Protocol address of the target centralized unit, an identity of the target centralized unit, a name of the target centralized unit, a duration of connecting with the source centralized unit, or an identity of the distributed unit; and
transmit, to the source centralized unit, an acknowledgment to the request.

16. The apparatus of claim 15, wherein the request further comprises at least one of:
an indication that a handover for terminal device is triggered due to centralized unit switch, an identity of the distributed unit, front-haul application protocol (F1AP) user equipment context information, or a Radio Resource Control container.

17. The apparatus of claim 16, wherein the apparatus is further cased to at least one of: store the F1AP user equipment context information received in the request; generate a radio resource control reconfiguration message; update the user equipment F1AP context.

18. The apparatus of claim 15, wherein the acknowledgement comprises at least one of: centralized unit user equipment F1AP identifier, distributed unit user equipment F1AP identifier, F1AP user equipment context, or a radio resource control container.

19. The apparatus of claim 15, wherein the distributed unit is on a satellite or the distributed unit is an integrated access and backhaul node.

20. The apparatus of claim 15, wherein the centralized unit is on a ground.

* * * * *